United States Patent [19]

Sugimoto et al.

[11] Patent Number: 4,718,881
[45] Date of Patent: Jan. 12, 1988

[54] FRICTIONAL TRANSMISSION CHAIN

[75] Inventors: Yoshiaki Sugimoto, Tokorozawa; Kazumi Ohmura, Minoo; Masaaki Matsumoto, Hanno; Hisaharu Terajima, Kasai; Nobuto Kozakura, Hanno, all of Japan

[73] Assignee: Tsubakimoto Chain Co., Japan

[21] Appl. No.: 828,201

[22] Filed: Feb. 10, 1986

[30] Foreign Application Priority Data

| Feb. 12, 1985 | [JP] | Japan | 60-16981 |
| Oct. 31, 1985 | [JP] | Japan | 60-166742 |
| Oct. 31, 1985 | [JP] | Japan | 60-166743 |
| Oct. 31, 1985 | [JP] | Japan | 60-166744 |
| Oct. 31, 1985 | [JP] | Japan | 60-166745 |
| Oct. 31, 1985 | [JP] | Japan | 60-166746 |
| Dec. 25, 1985 | [JP] | Japan | 60-198364 |

[51] Int. Cl.$^4$ .......................... F16G 5/18; F16G 5/20
[52] U.S. Cl. .................................... 474/242; 474/201
[58] Field of Search ............... 474/201, 242, 244, 245, 474/265, 228, 229, 219

[56] References Cited

U.S. PATENT DOCUMENTS

| 4,392,843 | 7/1983 | Smit | 474/245 |
| 4,427,401 | 1/1984 | Hendriks et al. | 474/201 |
| 4,464,151 | 8/1984 | Kahl | 474/228 X |
| 4,464,152 | 8/1984 | Kern | 474/245 |
| 4,516,963 | 5/1985 | Mott | 474/245 |
| 4,525,160 | 6/1985 | Okawa et al. | 474/242 |
| 4,541,822 | 9/1985 | Stiles | 474/201 |
| 4,545,779 | 10/1985 | Sakakibara et al. | 474/240 |
| 4,580,999 | 4/1986 | Ledford | 474/245 X |

FOREIGN PATENT DOCUMENTS

| 121350 | 1/1946 | Denmark | 474/242 |
| 395074 | 5/1924 | Fed. Rep. of Germany | 474/245 |
| 1085383 | 7/1960 | Fed. Rep. of Germany | 474/236 |
| 54-52253 | 4/1979 | Japan . | |
| 52647 | 5/1981 | Japan | 474/242 |
| 9344 | 1/1982 | Japan | 474/201 |
| 59-17043 | 1/1984 | Japan . | |
| 418515 | 10/1934 | United Kingdom | 474/244 |

Primary Examiner—Stephen J. Novosad
Assistant Examiner—Matthew Smith
Attorney, Agent, or Firm—Steele, Gould & Fried

[57] ABSTRACT

A frictional transmission chain, comprising: an endless transmission chain formed from link plates and link plate connection pins; a plurality of frictional V blocks, each having a hollow interior through which a portion of the endless transmission chain extends, each having inner lateral surfaces with holes therein for receiving opposite ends of at least one of the connection pins, and each having inclined, generally trapezoidal outer lateral surfaces; and, frictional transmission contact surfaces of a generally V-shaped configuration, transversely symmetrical about a centrally disposed recessed portion, and projecting radially from the outer inclined lateral surfaces with respect to a V-groove pulley with which the transmission chain is adapted to tightly frictionally engage by means of the V blocks, power being transmitted along the chain only by the link plates and connection pins of the endless chain, each of the V blocks transmitting power only between its respective at least one connection pin and the pulley.

19 Claims, 30 Drawing Figures

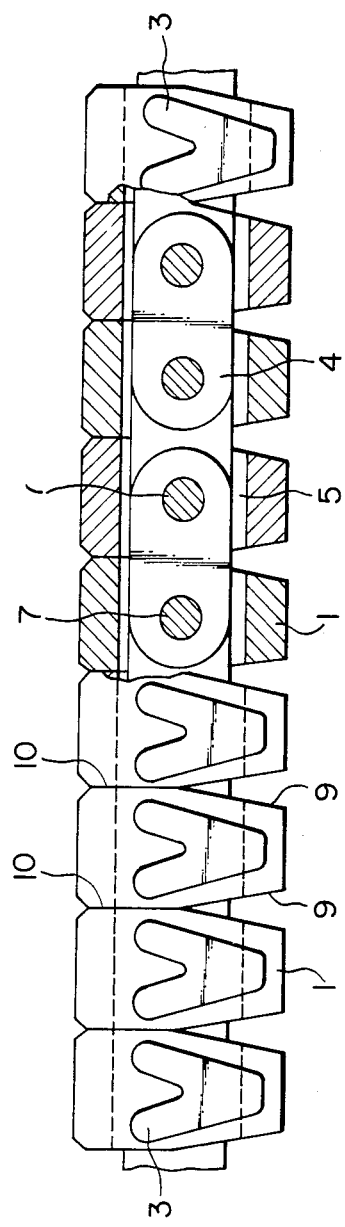
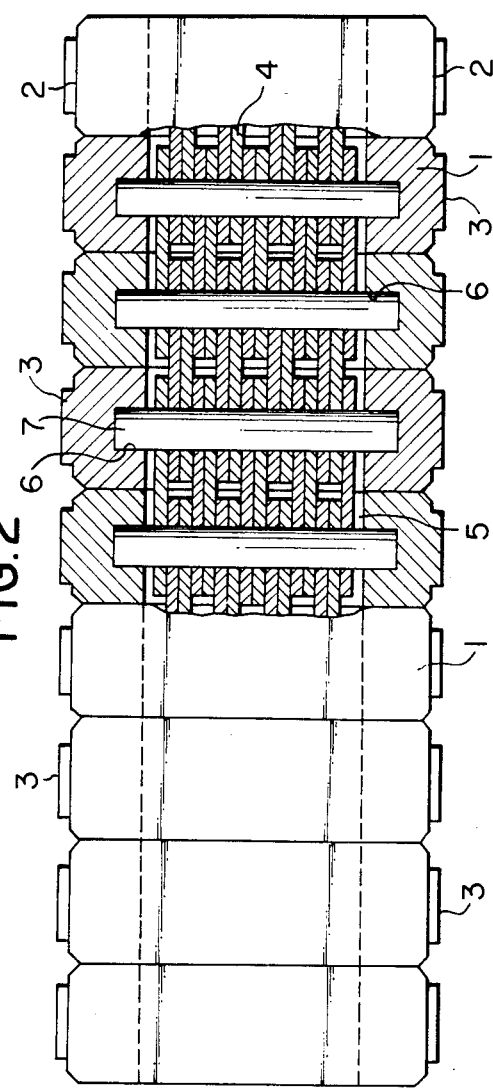

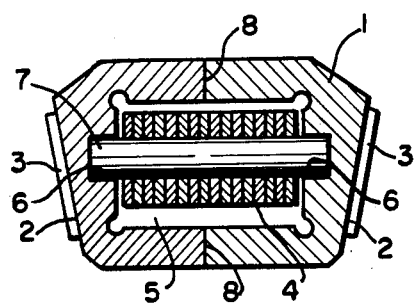
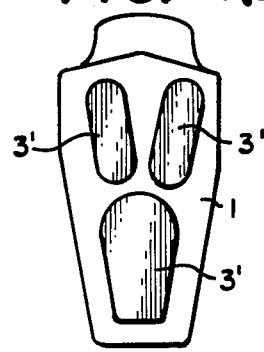
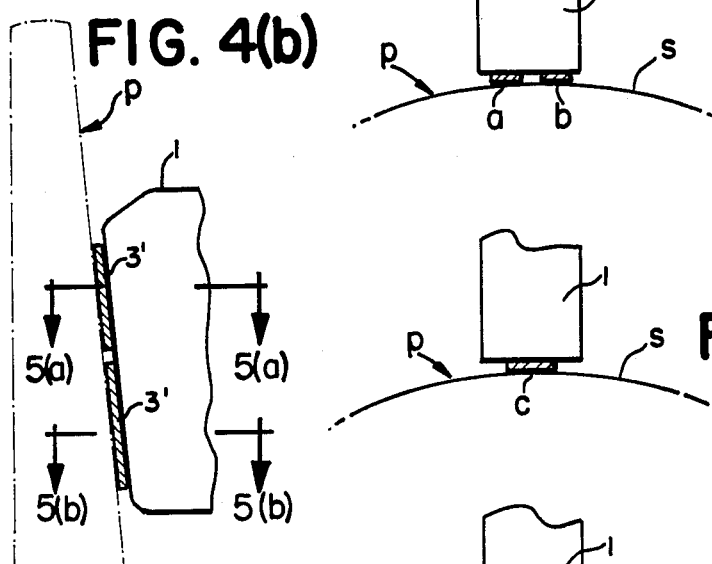
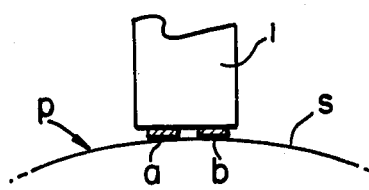
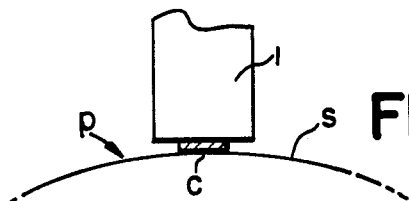
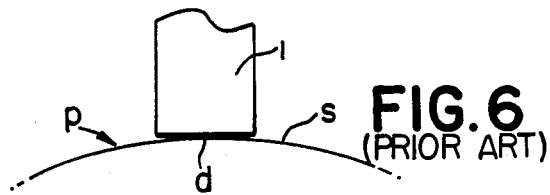

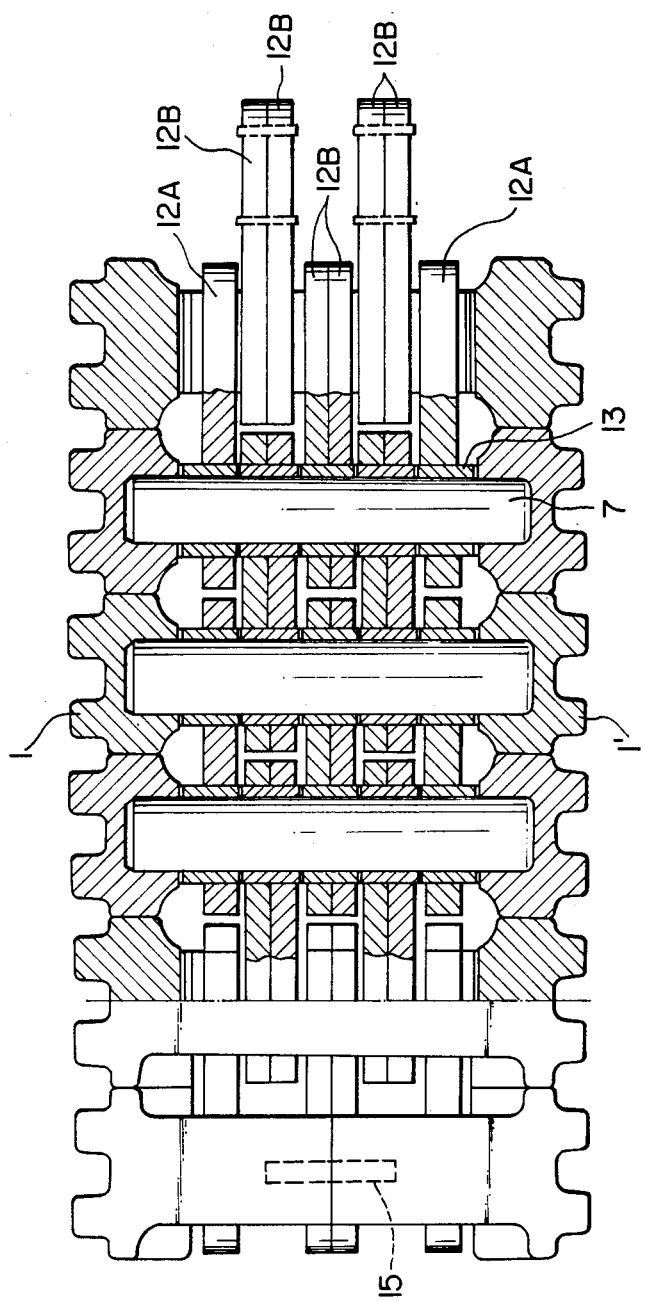

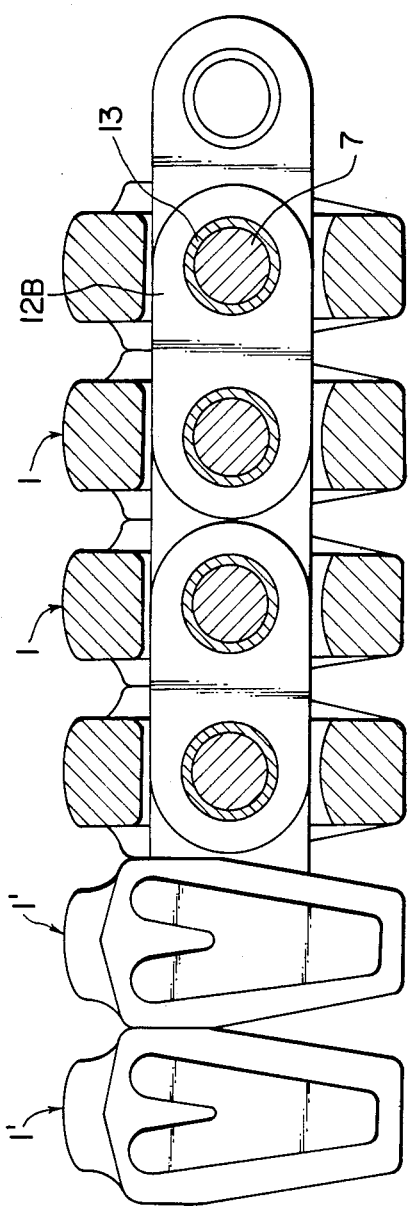
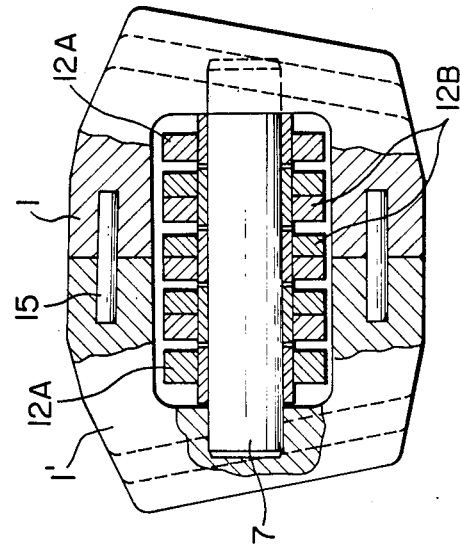

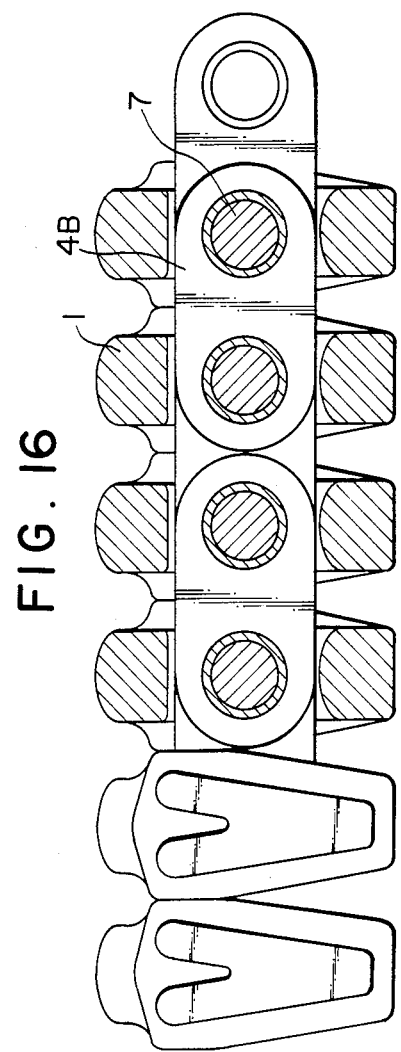
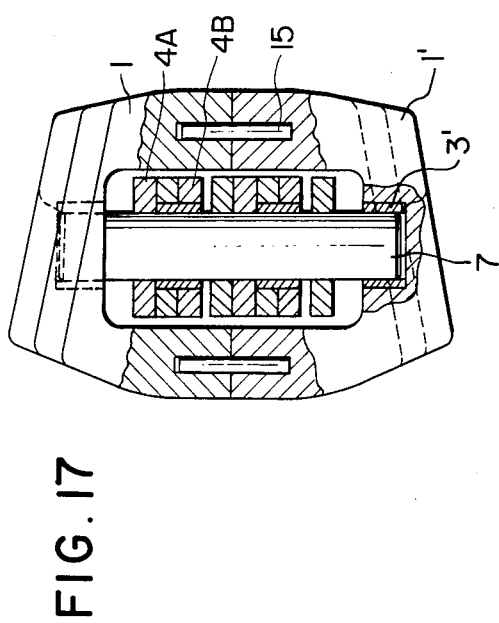
FIG. 16
FIG. 17

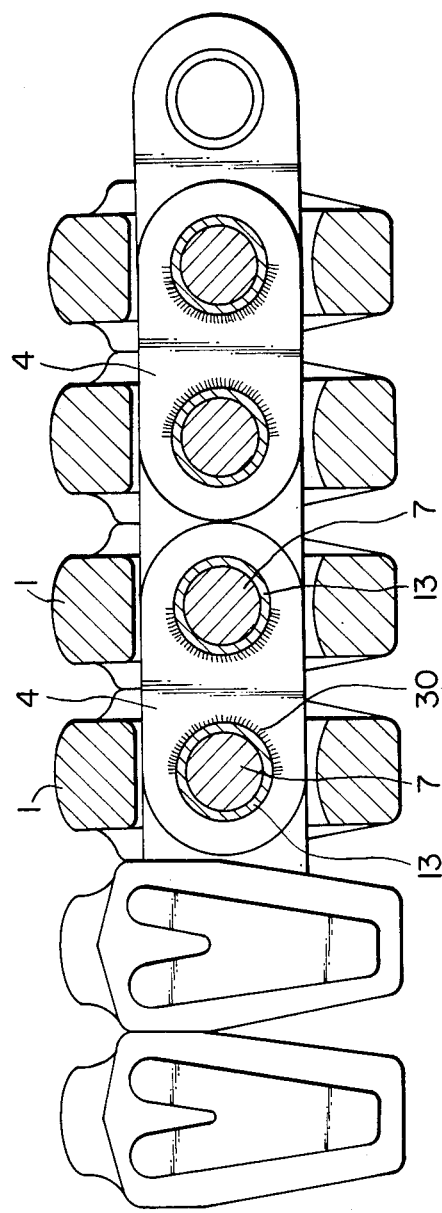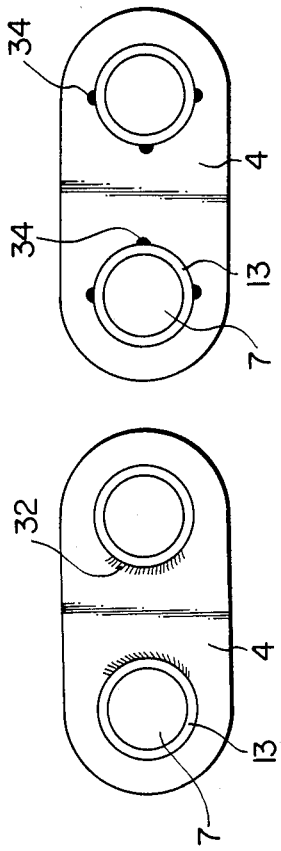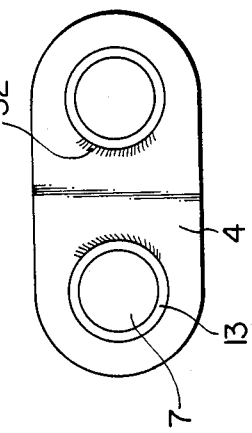
FIG. 21(a)
FIG. 21(b)
FIG. 21(c)

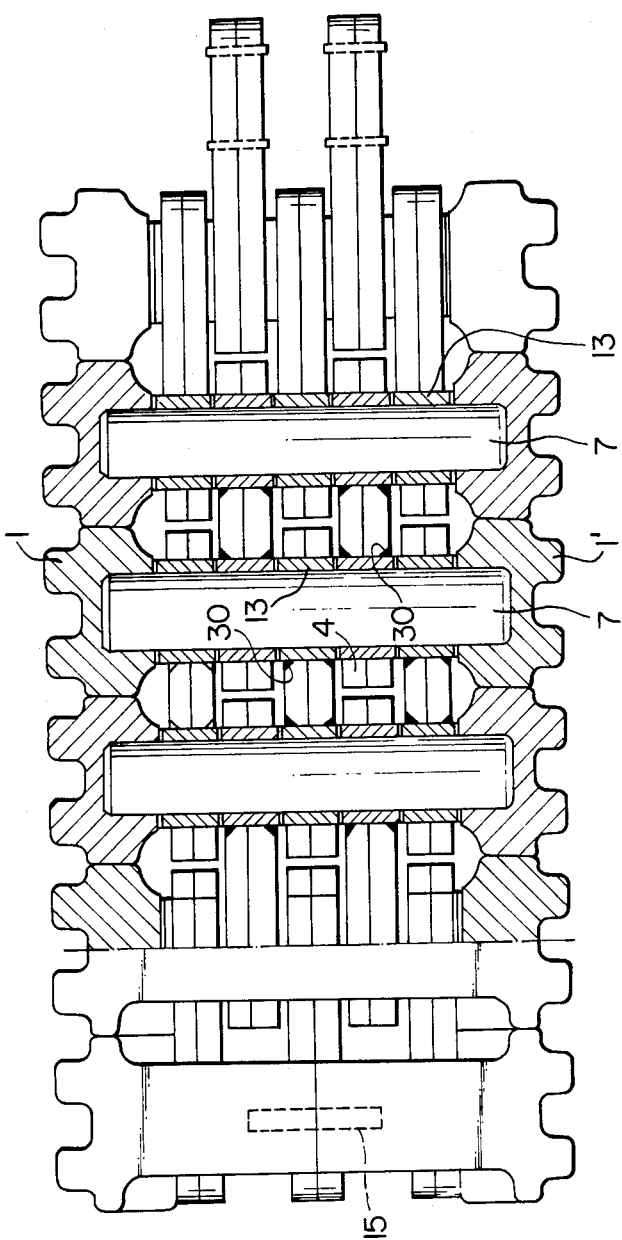

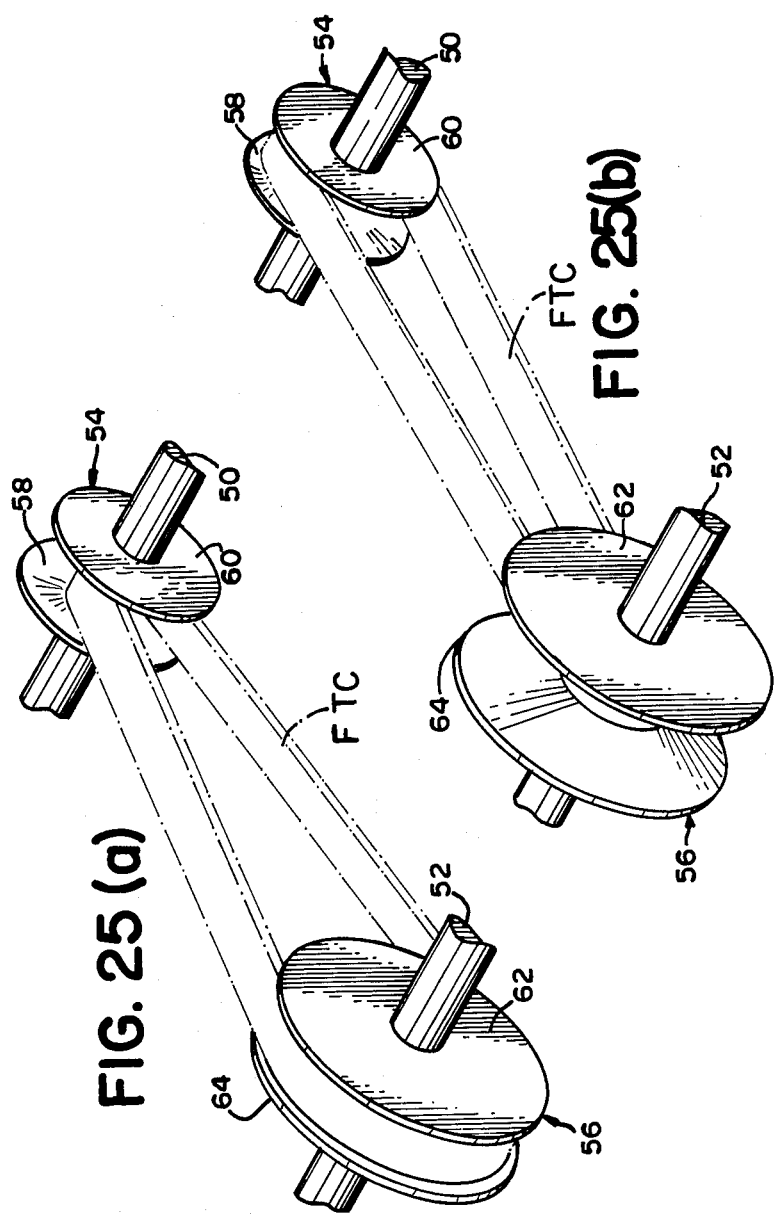

FRICTIONAL TRANSMISSION CHAIN

BACKGROUND OF THE INVENTION

1. Field of the Invention

This invention relates to the field of frictional transmission chains, and in particular, to frictional transmission chains of an entraining type power transmitting apparatus, for use in infinitely variable speed shift mechanisms and the like.

2. Prior Art

Until recently, it has been known to use a rubber V belt as an entrained transmission belt in an entraining drive type infinitely variable speed shift mechanisms. Recently, a metal V belt has been developed which has attracted much attention. A number of frictional transmission V blocks are lined up contiguously to each other and an endless steel-made band is passed through a hollow space defined in those blocks. Reference may be made to Japanese Patent Laid-Open Specification No. 54-52253.

Japanese Patent Laid-Open Specification No. 59-17043 discloses an improved metal V belt which has overcome a serious drawback of the steel-made band employed in such metal V belt. The steel band is subject to metal fatigue when it is flexed because it undergoes a tensile force on the outer side and a compression force on the inner side. More specifically, the improved metal V belt employs a link chain in place of a steel-made band. However, both the link chain and the steel band are slidable relative to frictional transmission V blocks through wihch the line chain or band is passed. Accordingly, both the steel band and the link chain are assembled to be slidable relative to the frictional transmission V blocks.

Furthermore, in both the steel band and chain link chains, each friction contact surface of each V block is in the form of a single plane which therefore makes only a single line or single point contact against the conical contact surface serving as a frictional transmission surface of a drive pulley. As a result, the friction contact area between the V block and the drive pulley is very small.

In such construction as described above, slippage occurs between the V block and the steel band or link chain upon flexing while turning round a pulley. The slippage in turn wears away the V blocks and the steel band or link chain, significantly reducing the durability of metal V belts.

The underlying theory of both constructions described above is transmitting power due to a thrust imposed from one V block to the subsequent V block, and therefore, in neither assembly is the steel-made band or link chain directly relied upon to contribute to power transmission. In each case, the steel-made band or chain link functions merely to hold a number of aligned V blocks in the form of an endless belt. Relative slippage between the V block and the steel or link chain was unavoidable. Further, a V groove of the V-groove pulley causes a tight holding pressure to be exerted on the V block, so that the steel-made band and link chain are subjected to a tensile force to balance with that pressure. This results in breakage due to metal fatigue, as well as wear of such band and chain.

Moreover, because of the small contact area between the friction contact surface of the V block and the conical contact surface of the V-groove pulley as previously noted, the large, tight holding pressure exerted from the V-shaped inclined surface of the V-groove pulley on the V block is concentrated on that small contact area, thereby making damage to the V block more likely. At the same time, the small contact area also necessarily reduces the efficiency of such friction transmission.

This invention disregards the underlying theoretical basis of known link chain friction drive chains, wherein power due to a thrust imposed on one V block is transmitted to a subsequent V block, and so on. Instead, this invention makes use of a link chain as a pulling transmission medium, even though it has been accepted by those skilled in the art that pulling kinds of power transmission due to a chain must always be effected in the form of an engagement transmission (e.g. toothed wheel and link chain). An endless transmission chain is passed through a central hollow space defined in a number of frictional transmission V blocks which are aligned contiguously to each other. The V blocks are each mounted over a link plate connection pin of the chain, and frictional transmission contact surfaces, symmetrical transversely, project from both generally V-shaped inclined surfaces (front and rear) of the V block. A infinitely variable speed shift mechanism has a pair of frictional transmission V-groove pulleys with the opposite surfaces formed into a V-shape and a variable spacing therebetween. Therefore, when an endless frictional transmission chain according to this invention is stretched between the pair of pulleys disposed in spaced relation, the friction contact surfaces projecting from both outer inclined surfaces of the frictional transmission V block are brought into contact with the opposite surfaces of the conical V-groove of the pulley at plural locations on each side. The V blocks are tightly held therebetween because the projected friction contact surfaces are formed to be transversely symmetrical along the radial direction of the pulley. As a result, the chain is driven while being pulled via the connection pins of the chain due to frictional transmission between the pulley and the V block. The V blocks transmit power only between the pulleys and the link-pin chain. Power is transmitted between the pulleys only by the link-pin chain, and not by forces transmitted between contiguous or adjacent V blocks.

Many other problems have been associated with friction drive chains, particularly those with link chains.

Conventional friction drive chains comprise a multiplicity of link plates press fitted about bushings and connected by pins to form an endless chain. The chain is disposed in a central cavity defined by openings in a plurality of pairs of generally channel-shaped struts, which from the individual V-blocks. The pairs of struts may be held together, for example, by pins, welding or adhesive. The same number of inner and outer link plates are usually employed. Alternatively, the number of the outer link plates has been equal to the number of the inner link plates plus one so that a symmetric arrangement may be achieved with respect to the longitudinal centerline of the chain, as shown in Japanese Laid-Open Patent Specification No. 226729/1984.

In either event, however, all of the link plates are equal in thickness, even though the outermost link plates which are subjected to the largest load begin to fracture first, and this fracture defines the end of the operational life of the chain. A continuously variable transmission (CVT) chain bears the force transmitted from the sheaves (of the pulleys) to the struts on both sides thereof, as opposed to a roller chain. Therefore, it is on the outermost link plates that the largest force acts.

If the chain is used for a speed change system in which only the sheaves on one side are driven (to vary speed), its centerline is displaced and the chain receives not only a static tensile load, but also a repeated bending load. The largest repeated bending stress occurs in the outermost link plates, and the outermost link plates are, therefore, the first to break.

According to this invention, this problem is overcome by providing outermost link plates having a thickness which is greater than that of the other link plates. Alternatively, the greater thickness can be achieved by using a greater number of link plates of identical thickness. Accordingly, the outermost link plates have a relatively larger cross sectional area (singly or in composite) and can, therefore, withstand a larger load.

In conventional friction drive chains, the opposite ends of each connecting pin are press fitted in the pair of struts, respectively. In friction drive chains of the type in which the connecting pins so extend into the struts and support them, the frictional force produced between the struts and the pulley sheaves is entirely transmitted to the connecting pins. The force acting on the connecting pins is considerably large, and the connecting pins are, therefore, press fitted in the struts so that there may not exist therebetween any clearance causing the uneven wear thereof. The press fitting of the connecting pins also has the advantage of facilitating the alignment of each pair of struts.

Insofar as each connecting pin is immovably fitted in the struts at the opposite ends thereof, however, the areas of its contact with the bushings of the link plates always remain unchanged. The connecting pins are therefore worn only on the opposite sides thereof as viewed longitudinally along the chain. This wear results in the elongation or loosening of the chain.

According to this invention, the connecting pins are not press fitted in the struts. Instead, the problem of uneven wear is solved by the provision of a bushing which is press fitted in each strut, and in which one of the connecting pins is rotatably received. Therefore, as each pin rotates randomly in the busings the entire periphery of each conecting pin defines a contact surface with the link bushings. Accordingly, the pins wear evenly.

It is difficult to fit a single link plate accurately about a bushing and it is, therefore, usual to fit two link plates together. The surfaces of the line plates are flush with the end surfaces of the bushing. This arrangement prevents the satisfactory flow of a lubricant into the gaps between adjoining bushings.

According to this invention, the problem of insufficient lubrication is solved by providing bushing each having a portion projecting laterally from each side of the link plates in which it is fitted. The link plates fitted about every two adjoining bushings in an assembled chain therefore have a gap or clearance which enables a lubricant to flow through the gaps between the bushings into the space between the bushings and a connecting pin.

It is possible to modify the cross sectional shape of each strut to ensure the satisfactory application of a lubricant to the chain, even when it is moving. The upper and lower ends of the struts may have a substantially trapezoidal cross section and be suitable for the application of a lubricant by nozzles arranged by perpendicularly to the chain. Alternatively, the upper and lower ends of the struts may have a substantially rhomboidal cross section and be suitable for the application of a lubricant by nozzles arranged at an inclined angle relative to the chain. The effective supply of a lubricant into the clearances between the bushings and the connecting pins renders the chain highly resistant to wear and thereby prolongs its life.

It is a characteristic of a CVT having a friction drive chain that, if the shafts for the sheaves has a fixed distance therebetween and the friction chain has a fixed length, the winding pitch diameters of the sheaves vary differently with a change of speed. In a speed change mechanism in which the sheave on one side is fixed and the sheave on the other side is movable, the centerline of the chain is therefore displaced with each change of speed.

In conventional friction drive chains for a CVT, the centerline of the V blocks or struts (friction blocks) is aligned with the line generating the radius of the sheaves when the struts are brought into winding contact with the sheaves. The struts and the pins are fixed to one another and all of the link plates are loosely fitted, that is, laterally slidable on the pins, relative to one another. Inasmuch as all of the link plates are loosely fitted on the connecting pins 4 (sometimes no bushing is employed), the transverse displacement of the chain (or the displacement of its centerline) is limited to an amount defined by the sum of gaps or clearances which is not great enough even for lubrication, as noted above.

According to this invention, the problems associated with displacement of the centerline of the chain are solved by firstly, using a bushing press fitted in each of the struts, ends of each of the pins being rotatably received in the bushings, and secondly, the pins carrying a plurality of fixed link plates and a plurality of laterally movable link plates. The centerline of a chain according to this construction is capable of displacement for every two pitches (the pitch being deemed the longitudinal width of the V blocks or struts). The displacement between the shafts amounts to a range which is equal to one half of the pitch number therebetween, multiplied by the transverse clearance for each pitch.

A problem which often arises with friction drive trains, particularly when the chain is used in an automobile, is the noise which is produced by the engagement of the V blocks (or struts) and pulley sheaves. The noise, reaching its peak at a regular or resonant frequency, is often intolerably unpleasant to persons in the automobile or otherwise close by. Insofar as the chain is moved by the engagement of the regularly repeated contact surfaces of the same shape with the sheaves, a loud noise is produced having a basic frequency which is determined by the number of the V blocks contacting the sheaves during each second.

According to this invention, the noise problem is solved by a friction drive chain having a plurality of V-shaped contact surfaces projecting from each side thereof and spaced apart from one another by an irregular distance. Alternatively, the position of the contact surfaces on each block can be varied.

As the intervals of contact between the sheaves and the V blocks are necessarily irregular, their contacts are substantially free from any basic frequency. It is possible to lower the peak of the basic frequency in the frequency spectrum of the noise produced by their contact. Therefore, it is possible to reduce the noise. If the intervals of contact between the sheaves and the V blocks are periodically varied, it is possible to control the basic frequency in the frequency spectrum of the noise produced by their contact and thereby convert the noise to something that is not so unpleasant.

The chains utilized in the art generally comprise a plurality of inner links formed by inner link plates press fitted about bushings, and a plurality of outer links formed by outer link plates press fitted about pins and connected to the inner links in an alternate fashion as noted. If a tensile load bears on the chain, bending and shearing stresses act on the pins and the bushings, and tensile stresses act on the link plates. The areas surrounding the holes of the link plates in which the pins and the bushings are fitted eventually yield to the tensile stress and undergo plastic deformation. This deformation gives rise to a reduction in the force holding the outer link plates and the pins together, and the inner link plates and the bushings together, thereby loosening the outer link plates relative to the pins, or the inner link plates relative to the bushings, or both. This reduction in force and the loosening lower the durability of the chain and can cause accidents or problems, such as the fracture of the link plates, pins and bushings due to fatigue or wear.

A solution to this problem is proposed in Japanese Patent Publication No. 15926/1975. It discloses the welding of the link plates to the pins or bushings. The welding proposed, however, is carried out along the entire periphery of the pins or bushings. The heat applied for welding extends even to the friction surfaces of the pins or bushings and is very likely to adversely affect the heat treatment which has been given to those surfaces to improve their wear resistance.

According to this invention, the problem of reduction in heat resistance is solved by welding each link plate to a pin or bushing only along a semicircular joint located toward the center of the link plate. The joint need not necessarily be continuous, or even extend fully over 180° around the pin or bushing.

The partial welding along the semicircular joint minimizes the effect of heat on the other or unwelded area and prevents the development of any gap which might occur between the link plate and the bushing or pin when the chain is loaded. Thus, this invention reduces the concentration of stress on the welded joint and improves the fatigue resistance and strength of the chain.

Each of the problems noted herein is more or less serious depending upon the working environment. Accordingly, the application of one, of several or of all the proposed solutions will be more or less appropriate under different circumstances.

SUMMARY OF THE INVENTION

It is an object of this invention to provide an improved frictional transmission chain.

It is another object of this invention to provide an improved frictional transmission chain wherein the transmission of torque forces between pulleys relies upon an endless transmission chain formed from link plates and link plate connection pins, rather than upon the transmission of forces between a plurality of frictional blocks in which the endless transmission chain is disposed.

It is yet another object of this invention to provide an improved frictional transmission chain wherein such frictional V blocks transmit power only between respective attachment points to the endless chain and the pulleys.

It is yet another object of this invention to provide a stronger frictional transmission chain.

It is yet another object of this invention to provide a frictional transmission chain which can be more easily and fully lubricated during operation.

It is yet another object of this invention to provide an improved frictional transmission chain which can fully accommodate lateral displacement due to operation of variable width pulleys in infinitely variable speed shift mechamisms.

It is yet another object of this invention to reduce noise problems due to operation of frictional transmission chains.

These and other objects of this invention are accomplished by a frictional transmission chain, comprising: an endless transmission chain formed from link plates and link plate connection pins; a plurality of frictional V blocks, each having inner and outer lateral surfaces, the inner lateral surfaces having holes therein for receiving opposite ends of at least one of the connection pins, and the outer lateral surfaces forming substantially V-shaped inclined surfaces; and, frictional transmission contact surfaces projecting radially from the outer inclined lateral surfaces, in a transversely symmetrical configuration, with respect to a V-groove pulley with which the transmission chain is adapted to tightly frictionally engage by means of the V blocks, power being transmitted along the chain only by the link plates and connection pins of the endless chain, each of the V blocks transmitting power only between its respective at least one connection pin and the pulley.

These and other objects of this invention are also accomplished by providing the endless transmission chain with laterally outermost link plates which are thicker than inner link plates. Alternatively, the laterally outermost link plates may comprise at least two link plates in endless chains having link plates of uniform thickness.

These and other objects of this invention are also accomplished by the use of bushings press fitted in each of the holes in the inner lateral surfaces for rotatably receiving the link plate connection pins in the V blocks.

These and other objects are also accomplished by the use of bushings fitted in each link plate for each connection pin, each bushing having laterally projecting portions which assure clearances between all laterally adjacent link plates to facilitate lubrication of the chain.

These and other objects are also accomplished by use of a bushing fitted in each of the holes in the inner lateral surfaces for rotatably receiving the connection pins, and each of the connection pins engaging a plurality of laterally movable link plates and a plurality of laterally fixed link plates.

These and other objects of this invention are also accomplished by a frictional transmission chain wherein the contact surfaces of adjacent V blocks are not uniformly spaced from one another.

These and other objects of this invention are also accomplished by a frictional transmission chain wherein the plurality of link plates are each welded to respective connection pins along a joint not exceeding in extent a substantially semicircular arc facing the center of each link plate and centered on a longitudinal axis of each link plate.

These and other objects of this invention are also accomplished by various combinations and subcombinations of the solutions to various problems of the prior art described hereinbefore.

BRIEF DESCRIPTION OF THE DRAWINGS

Various embodiments of the invention are shown in the accompanying drawings, it being understood, however, that the invention is not limited to the precise arrangements and instrumentalities shown.

FIG. 1 is a front view, partly in section, of a friction chain drive according to this invention;

FIG. 2 is a plan view, partly in section, of the chain in FIG. 1;

FIG. 3 is a transverse sectional view of a frictional transmission V block (or struts), in enlarged scale;

FIG. 4(a) is a side view of the V block, showing another embodiment of a friction contact surface configuration for the V block;

FIG. 4(b) is a partial side view of the frictional engagement between a pulley and the V block of FIG. 4(a);

FIGS. 5(a) and 5(b) are section views taken along lines 5(a)—5(a) and 5(b)—5(b) respectively in FIG. 4(b);

FIG. 6 diagrammatically illustrates the contact point or line between the V-shaped conical surface of the V-groove pulley and the friction contact surface of a conventional V block, as found in the prior art;

FIG. 7 is a plan view, partly in section, showing the chain of FIGS. 1-3 as provided with thicker, outermost links;

FIG. 8 is a front view, partly in section, of FIG. 7;

FIG. 9 is a transverse section view through a V block in the chain of FIGS. 7 and 8;

FIG. 16 is a front view, partly in section, of FIG. 15;

FIG. 17 is a transverse section view through a V block of FIG. 15;

FIG. 21(a) is a front view, partly in section, of the chain of FIGS. 1-3, wherein the links are welded to the bushings to reduce stress concentration without jeopardizing heat tempering;

FIG. 21(b) is a front view of a pin, bushing and link assembly showing an alternative weld pattern to that of FIG. 21(a);

FIG. 21(c) is a front view of a pin, bushing and link assembly showing an alternative weld pattern to those of FIGS. 21(a) and 21(b);

FIG. 22 is a plan view, partly in section, of FIG. 21(a);

FIGS. 25(a) and 25(b) illustrate the operation of variable width V-groove pulleys in conjunction with a frictional transmission chain according to this invention.

DETAILED DESCRIPTION OF THE PREFERRED EMBODIMENTS

Figure 10:
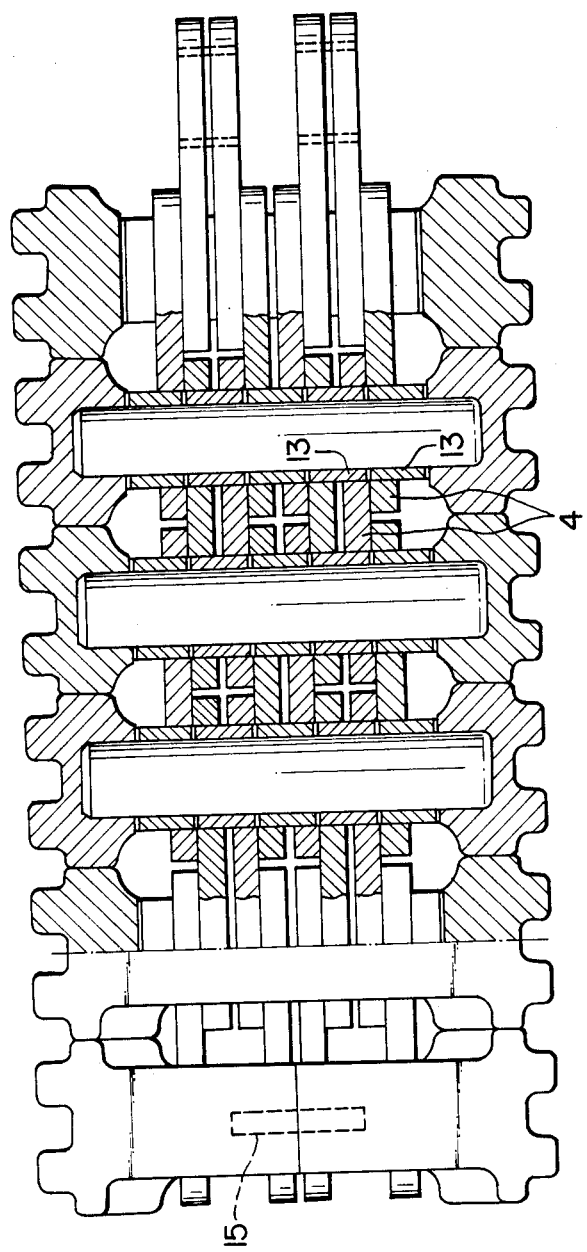
FIG. 10 is a plan view, partly in section, of a chain according to the prior art.

A frictional transmission chain FTC according to this invention is shown in FIGS. 1-3. A frictional transmission V block 1 has outer lateral surfaces on both sides formed into substantially V-shaped inclined surfaces 2, 2 of generally trapezoidal shape. Frictional transmission contact surfaces 3, 3 project from the inclined surfaces so as to be symmetrical transversely and extend in the radial direction of a V-groove pulley. A hollow space 5 is formed at the center through which an endless chain of link plates 4 and connection pins 7 is passed. Each block has an insertion hole 6, bored in the inner lateral surfaces, defining the hollow space, to receive one end of a connection pin 7 of a chain link plate.

Each frictional transmission V block 1 is divided transversely into two halves or struts, separable at the top and bottom walls to facilitate mounting over one of the connection pins 7. The opposite ends of the connection pin are fitted into the insertion holes 6 formed in the inner lateral surfaces of the V block, and the two halves are fixed to each other at division faces 8. The corresponding division faces can be welded to each other, or alternatively, if required, a guide pin 15 (as shown in FIG. 7) may project from one of the corresponding division faces 8, 8 and a guide pin insertion hole may be bored in the other. Press-fitted bushings (as shown for example in FIG. 7) may be used between the connection pins 6 and the link plates, to provide a more smoothly acting chain.

The front and rear surfaces of the frictional transmission V block 1 are formed into inclined surfaces 9, 9 spaced from each other at the lower half parts thereof, so that the successive V blocks, in the longitudinal direction, will not cause interference by flexing therebetween while turning around the pulley. The upper half parts are formed into upright surfaces 10, 10 abutting each other to prevent the V block from depending downwardly toward the tensioned side, and thereby prevent rattling of the chain. Further, as shown in FIGS. 4(a) and 4(b) the frictional transmission contact surface 3 projecting from each of the substantially V-shaped inclined surfaces 2, 2 may be formed of a plurality of frictional transmission contact surface portions 3', 3' separated from each other. In addition, a material having a relatively large coefficient of friction may be attached to the friction contact surface 3 or 3' in order to increase the frictional force. With the above arrangement, the frictional transmission V block 1 turning around the pulley, while being tightly held in its V groove, transmits a torque exerted from the pulley to the connection pin installed in the V block, so that a traction force of the connection pin 6 is transmitted to the entire chain via the link plate, thereby transmitting power due to a pulling force of the chain. Thus, the frictional transmission V block 1 has the function of a medium adapted to transmit a torque of the V-groove pulley to the connection pin, but no function of transmitting power due to a thrust exerted from one V block to a subsequent V block.

Furthermore, as shown in FIGS. 5(a) and 5(b) the frictional transmission contact surface 3 or 3' projecting from each of the inclined surfaces 2, 2 of the V. block is brought into contact with an opposite conical surface S of the frictional transmission pulley P in at least three locations such as a, b, and c positions, thus making it possible to increase the contact area therebetween.

As a result, it has been found from experiments that the chain of the present invention has at least twice the pressure-resistant strength and the frictional transmission efficiency in comparision with the prior art, as shown in FIG. 6.

In accordance with this construction, wherein the frictional transmission block is connected to a chain and no slippage occurs therebetween, the durability of the V block is improved significantly and a chain of the type usually employed for engagement transmission (with a toothed gear or wheel) can now be employed for frictional transmissions. As a result, such chains in general become more useful as they can be used in a frictioal transmission chain for infinitely variable speed shift mechanisms as shown in FIGS. 25(a) and 25(b). Shafts 50 and 52 are provided with variable width pulleys 54 and 56 respectively. Pulley 54 has a flange 58 axially moveable relative to flange 60. Pulley 56 has a flange 62 axially moveable relative to flange 64. The pulleys are connected by a chain FTC according to this invention. Further, since the contact area between the V block and the V-groove pulley is increased, the force holding the chain tightly in the pulley can be prevented from concentrating in a small area, so as to reduce the surface pressure, with the result that the strength against the tightly holding force is increased to eliminate the possibility damaging the V block. The increased contact area also makes it possible to significantly improve the torque transmission efficiency.

An additional aspect of this invention is shown in FIGS. 7-9. FIGS. 7-9 also illustrate a differently shaped V block and hollow space 5'. The outermost link plates 12A have a thickness which is about 1.5 times greater than that of the other link plates 12B. The differences can be appreciated better by reference to the chain shown in FIG. 10. The additional thickness of the outermost link plates (or the additional number thereof) depends on the purpose for which the individual chain is used. However, it is usually sufficient for the outermost link plates to have a thickness not exceeding twice as large as that of the other link plates. The use of an additional number of outermost link plates has the advantage that it is not necessary to prepare link plates of different thicknesses.

The strength of the chain as a whole can be improved only if the thickness of the outermost link plates, which bear the largest load, is increased. This aspect of the invention relies on a balance of dynamic fatigue strength, as opposed to the prior art approach which considered only a balance of static strength.

Figure 11:
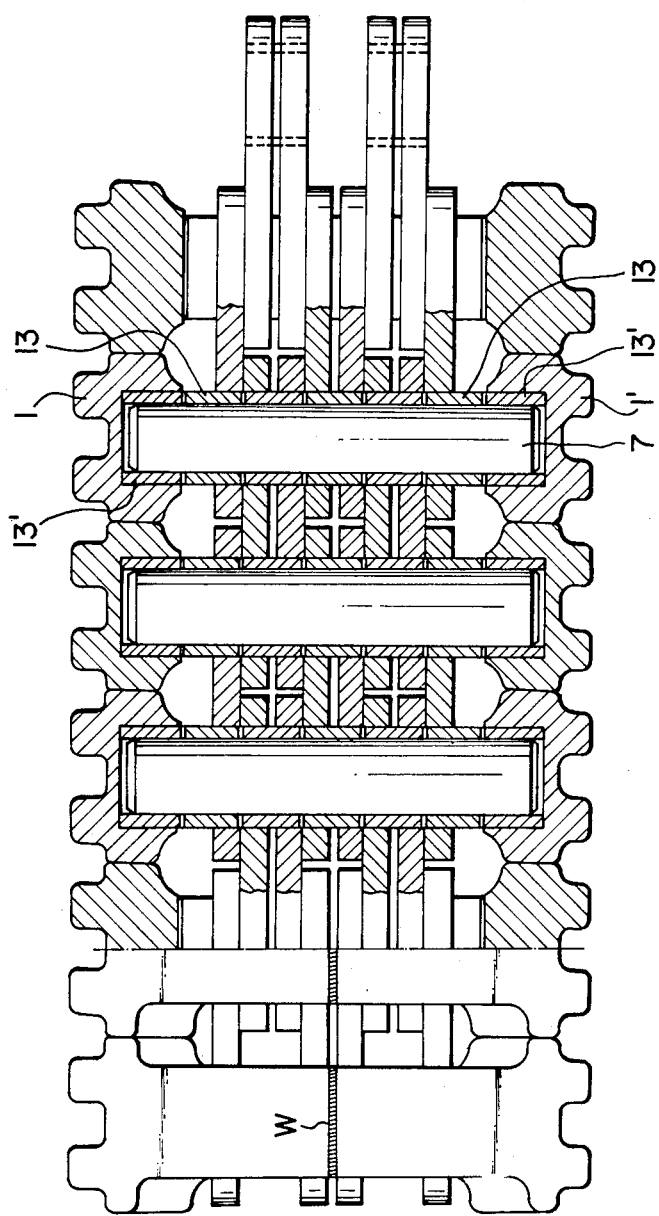
FIG. 11 is a plan view, partly in section, of the chain of FIGS. 1-3, as provided with bushings for mounting the pins in the V blocks.

A further aspect of this invention is shown in FIG. 11. A pair of bushings 13, 13' are each press fitted on the inner surface of one of the V blocks or struts 1, 1'. The opposite ends of each connecting pin 7 are movably received in the bushings 13', respectively. In any other aspect of construction, the chain is similar to that shown in FIG. 2. Each pair of struts 1 and 1' are preferably secured to each other, for example, by welding, as indicated by reference W in FIG. 11.

As the connecting pins 7 are rotatable in the bushings 13', the whole peripheral surface of each pin is brought into contact with the bushings 13 about which the link plates are fitted, when the chain is placed in operation. The connecting pins are not heavily worn, as there is no local wear. The rotation of the connecting pins ensures improved lubrication, which in turn contributes to reducing wear. The whole hardened surface layers of the connecting pins are effectively utilized to resist wear, thereby, substantially preventing any elongation or loosening of the chain.

It is difficult to fit a single link plate accurately about a bushing, and it is therefore usual to fit two link plates together, as shown in FIG. 10. The surfaces of the links or link plates 4 are flush with the end surfaces of the bushing 13. This arrangement prevents the satisfactory flow of a lubricant into the gaps between the adjoining bushing 13.

Figure 12:
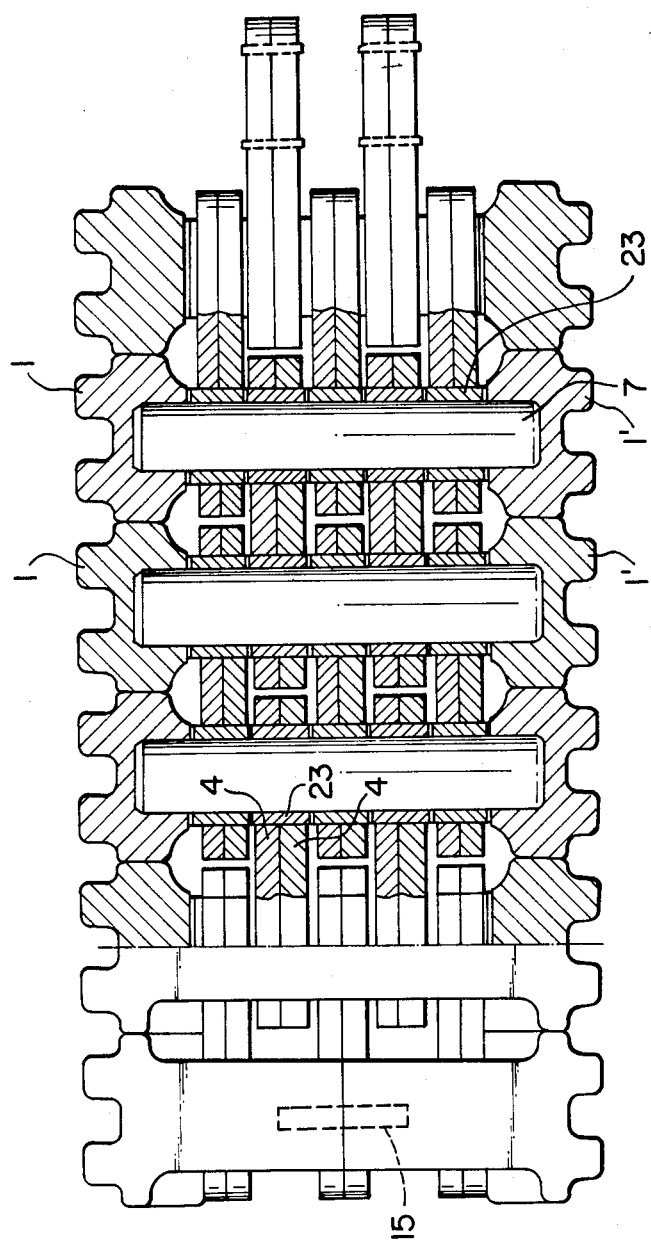
FIG. 12 is a plan view, partly in section, of the chain of FIGS. 1-3, as provided with bushings having laterally projecting portions to separate at least some of the links.
Figure 13:
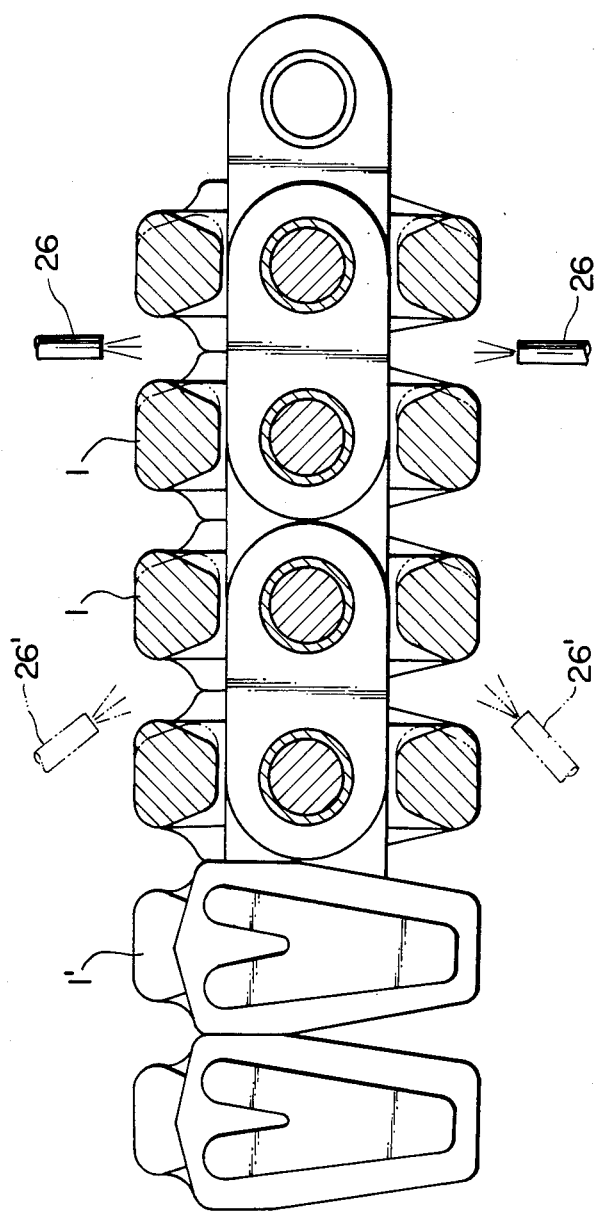
FIG. 13 is a front view, partly in section, of FIG. 12, diagrammatically illustrating the correlation between V block shape and lubrication nozzle geometry.
Figure 14:
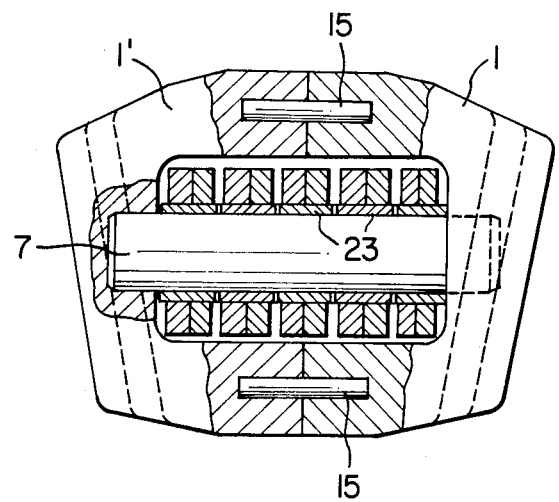
FIG. 14 is a transverse sectional view through a V block of FIG. 12.

According to a still further aspect of this invention, a bushing 23, press fitted, has a portion projecting laterally from each side of the link plates 4, as shown in FIGS. 12-14. In any other aspect, the construction of the chain may be as described hereinbefore.

The link plates fitted about every two adjoining bushings in an assembled chain have a clearance or gap therebetween which enables a lubricant to flow through the gaps between the bushings into the space between the bushings and a connecting pin.

It is possible to modify the cross sectional shape of each strut as shown in FIG. 13. This construction ensures the satisfactory application of a lubricant to the chain even when it is moving. The upper and lower ends of the struts 1 and 1' which are shown by solid lines in FIG. 13 have a substantially trapezoidal cross section and are suitable for the application of a lubricant by perpendicularly arranged nozzles 26. The upper and lower ends of the struts which are shown by broken lines have a substantially rhomboidal cross section and are suitable for the application of a lubricant by angularly inclined nozzles 26'. The effective supply of a lubricant into the clearances between the bushings and the connecting pins renders the chain highly resistant to wear and thereby prolongs its life.

In a conventional friction drive chain for a CVT, the centerline of the struts (friction blocks) is aligned with the line generating the radius of the sheaves when the struts are brought into winding contact with the sheaves. Therefore, the struts and the pins are fixed and all of the link plates are loosely fitted.

Figure 18:
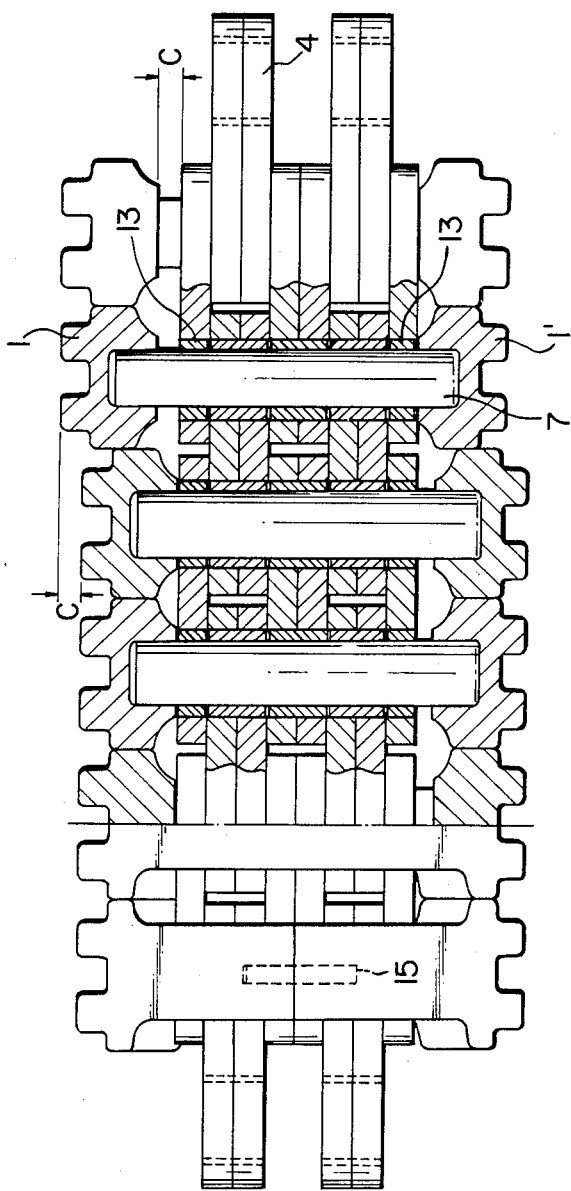
FIG. 18 is a plan view, partly in section, illustrating marginal lateral shift compensation in a prior art chain.

Such a known friction drive chain is shown by way of example in FIG. 18. It comprises a plurality of pairs of generally channel-shaped struts 1 and 1' disposed in an endless array and defining a central cavity in which link plates 4 forming an endless transmission chain are press fitted about bushings 13 and connected by connecting pins 7. Each pair of struts 1 and 1' are connected to each other by a pin 15. All of the link plates 4 are loosely fitted on the connecting pins 7 (indeed, sometimes no bushing 13 is employed). Therefore, the transverse displacement of the chain (or the displacement of its centerline) is limited to an amount defined by a clearance which is indicated at C.

Figure 15:
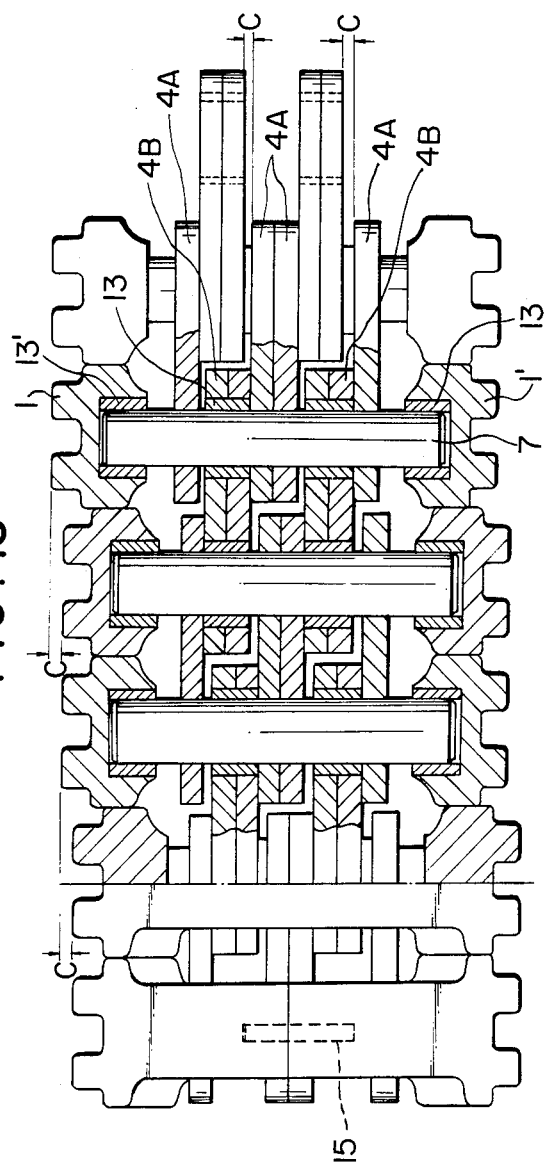
FIG. 15 is a plan view, partly in section, showing the chain of FIGS. 1-3, as modified to compensate for the centerline shift of movable-side-sheave pulleys during speed changes.

In yet another aspect of this invention, as shown in FIGS. 15-17, the chain compensates for the centerline translation. Firstly, and as shown in FIG. 11, a bushing is press fitted in each of the struts 1', the ends of each of the pins 7 being rotatably received the bushings 13'. Secondly, the pins 7 carry both a plurality of laterally fixed link plates and a plurality of laterally movable link plates. A plurality of fixed link plates 4A are secured to the connecting pins 7. A plurality of link plates 4B are carried movably on the pins by bushings 13, though sometimes no bushings are employed.

The link plates 4B are transversely movable by an amount defined by a clearance indicated at C. As is clear from FIG. 15, the chain is capable of transverse displacement by the amount C for every two pitches. As the link plates 4A are secured to the connecting pins 7, the pins 4 are rotatable in the bushings 13' relative to the struts 1 and 1'.

The conventional chain fails to provide a speed changer having a high speed change ratio, since its centerline is capable of displacement only to a limited extent. The centerline of the chain according to this aspect of the invention is capable of displacement for every two pitches. Its displacement between the shafts amounts to a range which is equal to one half of the pitch number therebetween multiplied by the transverse clearance for each pitch. Therefore the invention is free from any horizontal bending. Therefore, it is possible to ensure a uniform distribution of load on the chain and the like plates and thereby increase the transmission power of the chain.

Figure 19:
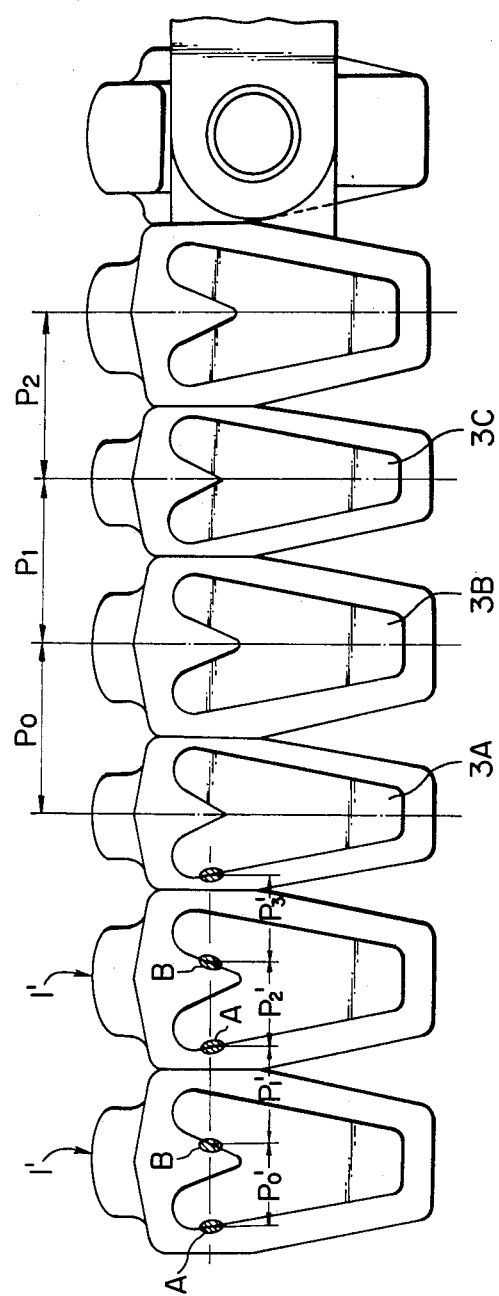
FIG. 19 is a front view of the chain of FIGS. 1-3, as modified to eliminate noise problems by pitch variation.

FIG. 19 shows a friction drive chain according to a first embodiment of yet another aspect of this invention. It is characterized by a chain having a plurality of pitches. In other words, a plurality of pairs of struts 1 and 1' forming V blocks have three different pitches as indicated at $P_0$, $P_1$ and $P_2$, pitch being defined as width along the chain. Therefore, V-shaped projecting surfaces 3A, 3B, 3C are slightly different in shape from one another and are spaced differently from one another.

Figure 20:
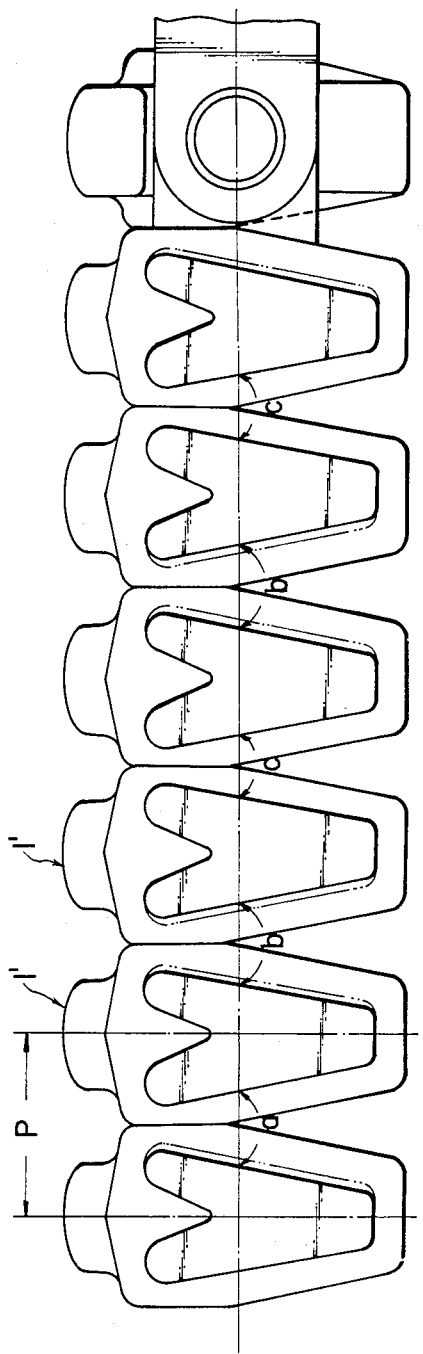
FIG. 20 is a front view of the chain of FIGS. 1-3, as modified to eliminate noise problems by contact surface position variation.

FIG. 20 shows a second embodiment of this aspect of this invention. The V blocks (1 and 1') have an equal pitch, but their contact surfaces are slightly displaced relative to the pitch line. If there are a multiplicity of V blocks which are differently displaced (or in other words, have differently shaped contact surfaces), it is possible to establish a variety of different V block pitches and thereby attain another object of this invention.

The embodiment shown in FIG. 20 has three V block pitches. The three V block pitches a, b and c can be obtained if one type of blocks having a contact surface displaced relative to the pitch line are appropriately combined with other types of blocks. The pitch b is larger than a and c, and the pitch c is smaller than a and b.

If the shape of the contact surface differs from one block to another, it is possible to vary the distance between the contact surface of one block and that of another. If is possible to control the nature of the noise produced by the engagement of the V blocks and the sheaves, as it is possible to alter the individual frequency spectrum thereof.

The V-shaped contact surfaces according to this invention are characterized by producing noise twice when they contact the sheaves at points A and B in FIG. 19. From the standpoint of the striking noise, therefore, it is necessary to look at the V blocks as if each block had two contact surfaces. It is, therefore, necessary to consider the pitches as shown at $P_0'$, $P_1'$, $P_2'$, ... in FIG. 19 by way of example. It is necessary to consider the substantial distance between the contact surfaces, rather than the pitches.

This is also the case in FIG. 20. The use of the V-shaped contact surface configuration makes it easier to vary the distance between the contact surfaces from the standpoint of the striking sound. The term "V-shaped" as herein used includes any shape looking substantially like the letter V, even if it may have a lacking portion. As the intervals of contact between the sheaves and the V blocks are irregular, their contact is substantially free from any basic frequency and the noise thereby produced can, therefore, be reduced. It is therefore possible to control the basic frequency in the frequency spectrum of the noise produced by the contact.

A final aspect of the invention forms part of the CVT (continuously variable transmission) chain shown in FIGS. 21(a)-21(c) and 22. It comprises a plurality of pairs of generally channel-shaped struts 1 and 1', and a plurality of link plates 4 press fitted about bushings 13 and connected by pins 7 to form an endless chain. Each pair of struts 1, 1' is connected to each other by a pin 15.

Figure 23:
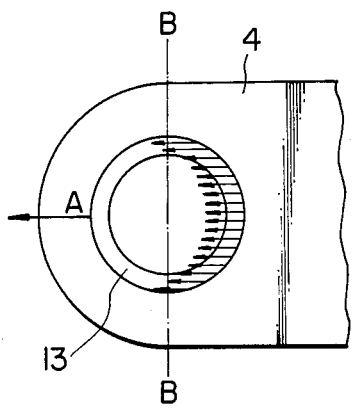
FIG. 23 is a diagrammatic illustration of the tensile forces acting on the pin, bushing and link assembly.

Each link or link plate 4 is welded by a laser to a bushing 13 along a semicircular joint 30 centered on the longitudinal axis of the link plate. The load bears on the portion A and the semicircular joint as a whole between the link plate 4 and the bushing 13, as shown in FIG. 23. Therefore, it is possible to reduce the stress which is produced in the cross section B—B of the link. This aspect of the invention is intended to reduce the concentration of stress in the cross section B—B by preventing the formation of any clearance or gap in the welded joint. It is sufficient to weld the link plate to the bushing at at least one point located on the opposite side of the line B—B from the point A. It is not always necessary to provide a semicircularly continuous joint as in FIG. 21(a). A weld with a shorter arcuate joint 32 as shown in FIG. 21(b), or several spot weld joints 34 as shown in FIG. 21(c), is also effective.

Figure 24:
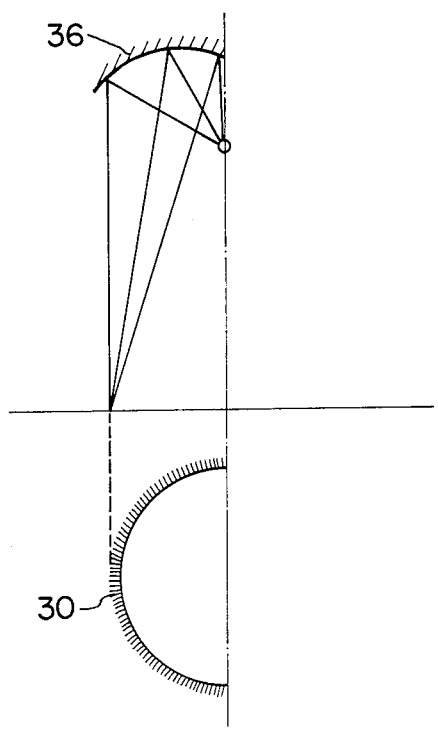
FIG. 24 is a diagrammatic illustration of a laser welding technique.

In order to form a semicircularly continuous joint, it is useful to employ a mirror 36, as shown in FIG. 24, to focus the light of the laser on a semicircular line and thereby accomplish the welding in a single operation. It is, however, possible to apply a spotlight along the semicircular line. It is also possible to use an electron beam instead of the light of a laser.

This aspect of the invention enables the production of a chain of improved strength without having any adverse thermal effect on the frictional sliding surfaces of the pins and the bushings which are carburized or otherwise treated for improved wear resistance. As a laser or electron beam is, for example, used for welding, it is possible to minimize the strain which may be produced by heat, and avoid any undesirable thickening of the welded joint. The use of a laser, for example, facilitates the automatic fabrication of the chain.

It will be appreciated by those skilled in the art that the various aspects of the invention described in connection with FIGS. 7-24 can be combined with the embodiment of FIGS. 1-6 and with one another in virtually any subcombination and combination thereof. Illustration of a single frictional drive chain according to each and every aspect of the invention in a single figure would, as a practical matter, obscure rather than reveal the various aspects of the invention.

This invention, in any and all of its various aspects, may be embodied in another specific forms without departing from the spirit or essential attributes thereof.

Accordingly, reference should be made to the appended claims, rather than the foregoing specification as indicating the true scope of the invention.

What is claimed is:

1. A frictional chain, comprising:
   an endless transmission chain formed from link plates and link plate connection pins;
   a plurality of frictional V blocks, each having a hollow interior through which a portion of the endless transmission chain extends, each having inner lateral surfaces with holes therein for receiving opposite ends of at least one of the connection pins, and each having inclined, generally trapezoidal, outer lateral surfaces; and,
   outwardly projecting frictional transmission contact surfaces on the outer lateral surfaces of the blocks, the contact surfaces having a centrally disposed recessed portion and a generally V-shaped configuration, being transversely symmetrical about the centrally disposed recessed portion, the contact surfaces being engageable with a V-groove pulley with which the transmission chain is adapted to tightly frictionally engage by means of the V blocks, power being transmitted along the chain only by the link plates and connection pins of the endless chain and each of the V blocks transmitting power only between its respective at least one connection pin and the pulley, each of the contact surfaces being thereby engageable with such a V-groove pulley at a plurality of locations, whereby overall engagement pressure is substantially increased but more uniformly distributed.

2. The frictional transmission chain of claim 1, wherein the V blocks are formed by V block halves transversely divided relative to the longitudinal axis of the endless chain, engaged over respective connection pins and joined together.

3. The frictional transmission chain of claim 1, in combination with a continuously variable speed transmission comprising at least one pulley having a V-groove of variable width.

4. The frictional transmission chain of claim 1, wherein the contact surfaces are formed by at least two contact surface portions on each outer lateral surface.

5. The frictional transmission chain of claim 1, wherein the endless transmission chain comprises laterally outermost link plates and inner link plates and the outermost link plates are thicker than the inner link plates.

6. The frictional transmission chain of claim 1, wherein each of the link plates of the endless transmission chain is of substantially uniform thickness, the endless chain comprises laterally outermost link plate assemblies and inner plate sets, and each of the inner plate sets comprises a number of link plates more than the outermost link plate assemblies at least by one.

7. The frictional transmission chain of claim 1, further comprising a bushing fitted in each of the holes in the inner lateral surfaces, whereby each of the connection pins will be free to rotate relative to its respective V block and link plates.

8. The frictional transmission chain of claim 1, wherein the link plates are paired in sets, and comprising a bushing fitted in each link plate set for each connection pin, each bushing having outwardly projecting portions which assure clearances between all laterally adjacent link plate sets to facilitate lubrication of the chain.

9. The frictional transmission chain of claim 1, comprising a bushing fitted in each of the holes in the inner lateral surfaces, for rotatably receiving the connection pins, each of the connection pins engaging a plurality of link plates laterally moveable along the connection pins and a plurality of laterally fixed link plates.

10. The frictional transmission chain of claim 1, wherein the contact surfaces of adjacent V blocks are not uniformly spaced from one another.

11. The frictional transmission chain of claim 10, wherein at least some of the V blocks differ from at least some other of the V blocks, due to variations in at least one of the pitch of each V block and the position of each contact surface on the outer lateral surface relative to the longitudinal centerline of each V block.

12. The frictional transmission chain of claim 1, wherein a plurality of link plates, each having a longitudinal axis, are each welded to connection pins along a joint not exceeding in extent a substantially semicircular arc, the arc having a concavity opening toward the center of each link plate and centered on the longitudinal axis of each link plate.

13. The frictional transmission chain of claim 12, comprising a plurality of spot welds positioned on the semicircular arc.

14. The frictional transmission chain of claim 1, wherein the link plates are fitted with bushings for receiving the connection pins, and a plurality of the link plates are each welded to respective bushings along a joint not exceeding in extent a substantially semicircular arc facing the center of each link plate and centered on the longitudinal axis of each link plate.

15. The frictional transmission chain of claim 14, comprising a plurality of spot welds positioned on the semicircular arc.

16. A frictional transmission chain, comprising:
   an endless transmission chain formed from link plates, each having a longitudinal axis, and link connection pins, a welded joint being disposed between a plurality of the link plates and respective connection pins, each of the joints not exceeding in extent a substantially semicircular arc, the arc defining a concavity opening toward the center of each link plate and centered on the longitudinal axis of each link plate;
   a plurality of frictional V blocks, each having inner and outer lateral surfaces, the inner lateral surfaces having holes therein for receiving opposite ends of at least one of the connection pins, and the outer later surfaces forming substantially V-shaped inclined surfaces; and,
   frictional transmission contact surfaces projecting radially from the outer inclined lateral surfaces, in an transversely symmetrical configuration, with respect to a V-grooved pulley with which the transmission chain is adapted to tightly frictionally engage by means of the V blocks, power being transmitted along the chain only by the link plates and connection pins of the endless chain, each of the V blocks transmitting power only between its respective at least one connection pin and a pulley.

17. The frictional transmission chain of claim 16, wherein the link plates are affixed directly to the connection pins by the welded joints.

18. The frictional transmission chain of claim 16, further comprising bushings on the link plates for rotatably receiving the connection pins, the bushings being affixed to the link plates by the welded joints.

19. The frictional transmission chain of claim 16, comprising a plurality of spot welds positioned on the semicircular arc.

* * * * *